United States Patent
Ludewigt

(10) Patent No.: US 7,200,160 B2
(45) Date of Patent: Apr. 3, 2007

(54) LASER BEAM SOURCE WITH A LASER ELEMENT CONTAINING A THIN CRYSTAL DISK AS A LASER-ACTIVE MEDIUM

(75) Inventor: Klaus Ludewigt, Oststeinbeck (DE)

(73) Assignee: Rofin-Sinar Laser GmbH, Hamburg (DE)

(*) Notice: Subject to any disclaimer, the term of this patent is extended or adjusted under 35 U.S.C. 154(b) by 266 days.

(21) Appl. No.: 10/974,415

(22) Filed: Oct. 27, 2004

(65) Prior Publication Data

US 2005/0094689 A1    May 5, 2005

Related U.S. Application Data

(63) Continuation of application No. PCT/EP03/04372, filed on Apr. 25, 2003.

(30) Foreign Application Priority Data

Apr. 27, 2002   (DE) ................ 102 19 004

(51) Int. Cl.
H01S 3/04 (2006.01)
H01S 3/07 (2006.01)

(52) U.S. Cl. .................... 372/36; 372/34; 372/66; 372/67

(58) Field of Classification Search ........... 372/21, 372/22, 34–36, 66–67, 69–72
See application file for complete search history.

(56) References Cited

U.S. PATENT DOCUMENTS

| 5,363,391 | A | * | 11/1994 | Matthews et al. ............ 372/36 |
| 5,539,765 | A | * | 7/1996 | Sibbett et al. ................ 372/92 |
| 5,553,088 | A | * | 9/1996 | Brauch et al. ................ 372/34 |
| 5,627,853 | A | * | 5/1997 | Mooradian et al. ........... 372/92 |
| 5,651,023 | A | * | 7/1997 | MacKinnon ................ 372/107 |
| 5,802,086 | A | * | 9/1998 | Hargis et al. ................ 372/22 |
| 5,832,010 | A |   | 11/1998 | Fulbert et al. |
| 6,101,201 | A | * | 8/2000 | Hargis et al. ................ 372/36 |
| 6,160,824 | A |   | 12/2000 | Meissner et al. |
| 6,270,222 | B1 | * | 8/2001 | Herpst ........................ 359/511 |
| 6,347,109 | B1 |   | 2/2002 | Beach et al. |
| 6,385,220 | B1 | * | 5/2002 | Miller et al. ................. 372/34 |
| 6,600,763 | B2 |   | 7/2003 | Ludewigt |
| 6,747,789 | B2 | * | 6/2004 | Huonker et al. ............ 359/337 |
| 7,072,368 | B2 | * | 7/2006 | Mizell ........................ 372/21 |
| 2002/0110162 | A1 |   | 8/2002 | Ludewigt |

FOREIGN PATENT DOCUMENTS

| DE | 199 39 774 C2 | 3/2001 |
| DE | 101 42 005 A1 | 3/2003 |
| EP | 0 742 615 A1 | 11/1996 |
| JP | 2000077750 A | 3/2000 |
| WO | 01/15290 A1 | 3/2001 |

* cited by examiner

Primary Examiner—Minsun Oh Harvey
Assistant Examiner—Phillip Nguyen
(74) Attorney, Agent, or Firm—Laurence A. Greenberg; Werner H. Stemer; Ralph E. Locher

(57) ABSTRACT

A laser beam source has a laser element provided with a thin crystal disk as a laser active medium. The laser beam source has improved mechanical stability and improved thermal contact with respect to a cooling element on the flat side of the crystal disk that is disposed opposite the cooling element. A cooling disk is disposed between the crystal disk and the cooling element.

18 Claims, 2 Drawing Sheets

LASER BEAM SOURCE WITH A LASER ELEMENT CONTAINING A THIN CRYSTAL DISK AS A LASER-ACTIVE MEDIUM

CROSS-REFERENCE TO RELATED APPLICATION

This is a continuing application, under 35 U.S.C. § 120, of copending international application No. PCT/EP03/04372, filed Apr. 25, 2003, which designated the United States; this application also claims the priority, under 35 U.S.C. § 119, of German patent application No. 102 19 004.6, filed Apr. 27, 2002; the prior applications are herewith incorporated by reference in their entirety.

BACKGROUND OF THE INVENTION

Field of the Invention

The invention relates to a laser beam source with a laser element containing a thin crystal disk as a laser-active medium.

Such a laser beam source is known for example from U.S. Pat. No. 5,553,088. Such a laser beam source, which is also referred to in the literature as a disk laser, contains as a laser-active medium a thin crystal disk, which is only a few tenths of a millimeter to a few millimeters thick, typically has a diameter of an order of magnitude in the range of approximately 10 mm and is provided on one flat side with a reflective layer and on the opposite flat side with an antireflective layer. The disk-shaped laser element formed in this way is disposed on a solid heat sink, formed of copper, the surface that is provided with the reflective layer facing the heat sink.

The pumping light required for producing a population inversion is coupled into the crystal disk either on the narrow side or the face opposite from the heat sink. For more efficient utilization of the laterally coupled-in pumping light, it is proposed in Japan Abstract JP 2000-77750 A to dispose the crystal disk between two transparent layers with a refractive index which is slightly lower than the refractive index of the crystal disk, in order to achieve more efficient utilization of the pumping light by total reflection at the boundary surfaces.

For the connection of the laser element to the heat sink, a soft intermediate layer, for example indium (In), which can absorb the thermal deformations of the crystal during laser operation, is inserted. The heat produced in the crystal disk flows via the ductile intermediate layer into the solid heat sink. The latter is flowed through by a cooling fluid, generally water, whereby the heat is transported away.

However, the known construction has a series of disadvantages. The use of a ductile intermediate layer between the heat sink and the laser element has the effect that the heat transmission resistance is increased even when there is ideal contact over a large surface area. The heat transmission resistance is also highly dependent on the quality of the contact between the laser element and the heat sink, so that a great technical effort in terms of production is required to achieve adequate reproducibility of the thermal contact. This is made more difficult by the fact that the crystal disk, and consequently also the laser element formed by the crystal disk and thin functional layers, is very thin and fragile and can at most be fixed at the edge by moderate forces. This leads to considerable problems if there is high thermal loading. If the laser element is fixed with great play in the radial direction, it begins to slide on the ductile intermediate layer. If there is insufficient play, thermally caused deformations of the laser element or of the crystal disk cannot be avoided, leading to partial loss of the cooling contact as a result of the disk bowing, and a distinct deterioration in the heat removal occurring in these zones.

German Patent DE 199 39 774 C2, corresponding to U.S. Pat. No. 6,600,763 B2 and U.S. Patent Application Publication No. 2002/0110162 A1, discloses a disk laser in which the crystal disk forms a wall element of a cooling chamber receiving the cooling fluid, so that one of its flat sides is in thermal contact with the cooling fluid directly or only separated by thin functional layers (reflective layer, protective layer). Therefore, it is not the case that the heat is first removed to a solid heat sink, which for its part is cooled by a cooling fluid, but that direct heat transmission to the cooling fluid takes place. As a result, a minimal heat transmission resistance and efficient cooling are ensured. To increase stability, an optically transparent protective body is disposed on the side of the crystal disk that is facing away from the cooling chamber. This measure has the effect of avoiding deformation of the crystal disk, which without a supporting body would be caused by the difference in pressure that is produced between the cooling chamber and the exterior space on account of the pressure exerted by the cooling fluid. Similarly, vibrations of the crystal disk are suppressed and, in particular when coolant flows directly onto the crystal disk, breaking of the latter under excessive dynamic pressure is avoided. The use of a supporting body is of advantage in particular when the crystal disks are of a very small thickness, for example less than 300 μm, such as those used in high-power lasers.

To allow the highest possible power to be extracted, high-power disk lasers must be highly loaded during operation, so that, in spite of the supporting body, under high mechanical stresses a breakage may even occur when the theoretically possible maximum loading limit has not yet been reached.

SUMMARY OF THE INVENTION

It is accordingly an object of the invention to provide a laser beam source with a laser element containing a thin crystal disk as a laser-active medium which overcomes the above-mentioned disadvantages of the prior art devices of this general type, which has improved mechanical load-bearing capacity in comparison with the known construction while at the same time having good coolability.

With the foregoing and other objects in view there is provided, in accordance with the invention, a laser beam source. The laser beam source contains a cooling element and a laser element. The laser element contains a thin crystal disk functioning as a laser-active medium. The thin crystal disk has a first flat side being at least in indirect thermal contact with the cooling element and a second flat side. A cooling disk is disposed between the cooling element and the thin crystal disk. An optically transparent supporting body is disposed on the second flat side of the thin crystal disk, the second flat side faces away from the cooling element.

Attaching an optically transparent supporting body which is in surface area contact with the crystal disk and is preferably integrally connected to the latter, in particular by a diffusion bonding process, has the effect of increasing the stability of the overall construction and of making good thermal contact with the cooling element possible.

Since a cooling disk is disposed between the cooling element and the crystal disk, the crystal disk is effectively protected from mechanical loading on its flat side facing the cooling element. In addition, the radial temperature variation is made less pronounced and the temperature at the center of the crystal disk is reduced, in particular when the thermal conductivity of the cooling disk is greater than the thermal conductivity of the crystal disk.

In a particularly advantageous embodiment, the cooling disk contains sapphire. This material has the advantage that it has approximately the same coefficient of thermal expansion as a customarily used crystal disk of Yb:YAG, with at the same time high thermal conductivity.

The cooling disk is preferably integrally connected to the crystal disk, at least indirectly, in particular by a bonding process. Good thermal contact is ensured as a result. Furthermore, the mechanical and thermal load-bearing capacity of the thermal disk is increased, since the microcracks that are unavoidably produced during polishing of the crystal disk are closed, so that growth of these cracks when mechanical stresses act on the crystal disk is at least reduced. The stresses are produced both by forces which are externally exerted on the crystal disk and are caused by the mounting of the laser element on the cooling element and also by internal stresses which are produced by thermal loading of the crystal disk during laser operation. For the purposes of the invention, an at least indirect integral connection is understood as meaning a connection between the cooling disk and the crystal disk in which the latter are either directly adjacent to each other or are separated from each other at most by an intermediate layer only a few μm thick, for example a reflective layer vapor-deposited in a number of dielectric layers.

In a further advantageous embodiment, an optical element formed between the surface of the supporting body that is facing away from the crystal disk and a reflective surface disposed between the crystal disk and the cooling element acts as a curved resonator mirror. As a result, particularly advantageous resonator types that are adapted and optimized to the respective needs can be realized with a small construction. This effect can be brought about by a curvature of the surface of the supporting body that is facing away from the crystal disk or by a curvature of the reflective surface or by a combination of the two measures. Since the laser element itself acts as a curved resonator mirror, the use of resonator types that have a planar output mirror outside the laser element is also possible. This has the advantage that the laser beam emerging from the resonator does not undergo any additional beam shaping which has to be compensated by optical systems external of the resonator. Furthermore, the laser beam has a fixed beam constriction at the planar output mirror. As a result, the properties of the beam are determined by the configuration of the resonator alone, i.e. the propagation conditions for the laser beam within the resonator.

The reflective surface may be formed in this case by a reflective layer that is applied directly to the surface of the crystal disk that is facing away from the supporting body. The corresponding curvatures of the surfaces are in this case produced by grinding after bonding of the crystal disk and the supporting body has taken place.

In a further preferred embodiment, the cooling disk is optically transparent and the reflective surface is formed by a reflective layer disposed on the surface of the cooling disk that is facing away from the crystal disk. As a result, the thermal contact between the cooling disk and the crystal disk is not impaired by intermediate layers.

In an advantageous configuration, the surface of the cooling disk that is facing away from the crystal disk is convexly curved, i.e. outwardly curved. The reflective surface formed by the reflective layer applied to this surface and serving as a resonator mirror is then concavely curved and the resonator properties are improved.

In an advantageous configuration, the supporting body is an optical functional element, in particular a saturable absorber or a frequency multiplier. As a result, additional operating modes of the laser beam source can be realized without the need for further optical components.

In an embodiment of the invention, the cooling element is a metallic heat sink, which is preferably flowed through by a cooling fluid and is axially braced with the supporting body, a ductile intermediate layer being disposed between the heat sink and the crystal disk. Since the supporting body absorbs the forces occurring on the heat sink at the edge during the bracing of the construction and transmits them to the crystal disk over a large surface area, it is ensured that the crystal disk always bears with frictional contact against the heat sink over its entire flat side. Thermally induced deformations are then largely avoided.

As an alternative to this, a cooling chamber that receives a cooling fluid is provided as the cooling element, the laser element forming a wall element of the cooling chamber. As a result, particularly efficient cooling is ensured.

The surface of the laser element that is facing the cooling chamber is preferably provided with a protective layer, for example gold (Au) or silicon dioxide ($SiO_2$), in particular aluminum oxide ($Al_2O_3$). As a result, the stability of the laser element with respect to chemical and mechanical effects of the cooling fluid is increased.

In a further advantageous configuration of the invention, the crystal disk is axially pumped. An axial pumping configuration has the effect on the one hand of making it easier for pumping light to be coupled in, since it enters the crystal disk on the flat side. On the other hand, it also has the effect of making it possible for the crystal disk to be embedded into the cooling element, by the disk being completely enclosed at the lateral edge and consequently the heat removal being additionally improved.

Other features which are considered as characteristic for the invention are set forth in the appended claims.

Although the invention is illustrated and described herein as embodied in a laser beam source with a laser element containing a thin crystal disk as a laser-active medium, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
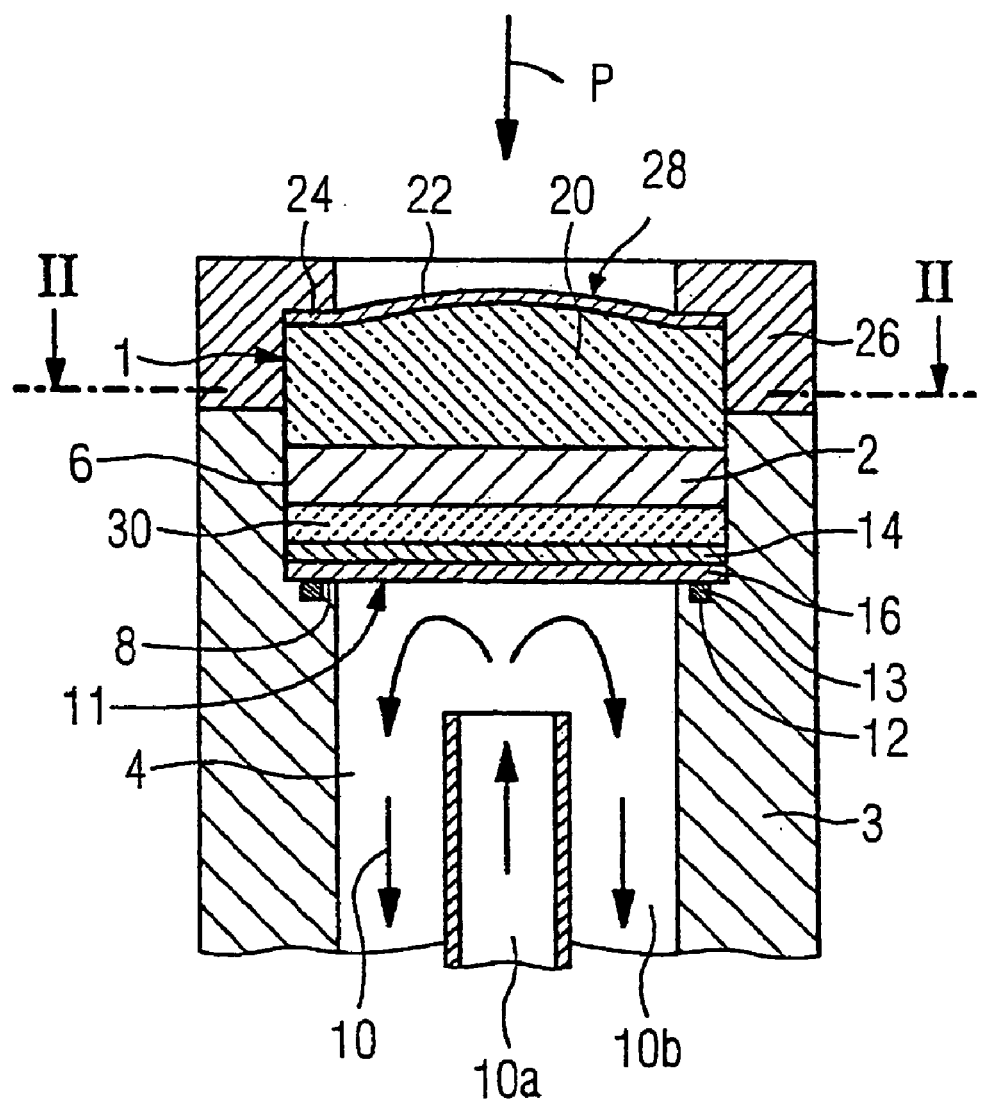
FIG. 1 is a diagrammatic, longitudinal section view of a laser beam source according to the invention.

Referring now to the figures of the drawing in detail and first, particularly, to FIG. 1 thereof, there is shown a laser beam source which contains a laser element 1. A laser-active medium of the laser element 1 is a thin crystal disk 2, a thickness of which in the exemplary embodiment is less than 300 µm, in particular between 100 and 200 µm. The laser element 1 is fitted into a wall 3 of a cooling chamber 4 serving as a cooling element and forms a wall element bounding the latter. The cooling chamber 4, which is hollow-cylindrical in the exemplary embodiment, is provided for this purpose with a recess 6 on the inner circumference, so that an annular bearing surface or shoulder 8 on which the laser element 1 rests is formed around the periphery. The recess 6 is dimensioned in the exemplary embodiment in such a way that the wall 3 rises up above the crystal disk 2 and completely encloses the latter at the lateral edge. In the cooling chamber 4, a cooling fluid 10 flows and cools a rear side 11 of the laser element 1 that is facing the cooling chamber 1. The cooling fluid 10 emerges from a feed channel 10a disposed in the interior of the cooling chamber 4 and flows directly against the rear side 11 of the laser element 1, is deflected by it and discharged into an annular channel 10b surrounding the feed channel 10a.

The shoulder 8 is provided with an annular groove 12 around the periphery, into which a sealing ring 13 is fitted in order to ensure tight sealing of the cooling chamber 4 with respect to the outside.

Disposed on a flat side of the crystal disk 2 that is facing away from the cooling chamber 4 is an optically transparent supporting body 20, which is provided on its free surface 28 that is facing away from the cooling chamber 4 with an antireflective layer 22, which is antireflective at least for the wavelength of the laser beam. The thickness of the supporting body 20 is greater than the thickness of the crystal disk 2 and in the exemplary embodiment is approximately 1 mm.

The free surface 28 of the supporting body 20 that is facing away from the crystal disk 2 is convexly curved (outwardly curved) in a central region, so that between free surface 28 of the supporting body 20 and a reflective surface, in the exemplary embodiment a planar reflective layer 14, located between the crystal disk 2 and the cooling element, an optical element is formed by the components between these surfaces. In the example the supporting body 20, the crystal disk 2 and the cooling disk 30 form the optical element which functions as a concave resonator mirror.

The convexly curved central region of the surface 28 is surrounded in an annular manner by a planar shoulder 24, on which a clamping ring 26 rests. The clamping ring 26 is braced against the end face of the wall 3, so that the laser element 1 is pressed firmly against the shoulder 8. The use of a clamping ring 26 has the effect that the clamping force is evenly distributed over the entire circumference of the supporting body 20.

To illustrate the invention, the curvature of the free surface 28 of the supporting body 20 that is represented in FIG. 1 is shown in an exaggerated form. With large radii of curvature in the range of meters, as are used in a practical embodiment, the planar shoulder 24 is not absolutely necessary as a supporting surface for the clamping ring 26 of an L-shaped form in longitudinal section. A notch effect at the edge of the clamping ring 26 can be avoided by inserting a flexible O-ring or by appropriate shaping of the clamping ring 26.

The supporting body 20 may contain undoped YAG. In this case, it is optically "passive". In particularly advantageous embodiments, the supporting body 20 undertakes an additional function and is, for example, a saturable absorber, for example a YAG crystal doped with chromium (Cr4+), in order to permit passive Q-switching operation. As an alternative to this, the supporting body 20 may also be a frequency multiplier crystal.

The crystal disk 2 is provided on its flat side that is facing away from the supporting body 20 with a cooling disk 30, the thermal conductivity of which is preferably greater than the thermal conductivity of the crystal disk 2. The cooling disk 30 is in contact with the cooling fluid 10 virtually with its entire surface that is facing away from the crystal disk 2 and brings about a homogenization of the radial temperature distribution of the crystal disk 2. The thickness of the cooling disk 30 corresponds approximately to the thickness of the crystal disk 2, in order to ensure both efficient lateral heat removal and still good cooling by the cooling fluid 10. Like the supporting body 20 and the crystal disk 2, the crystal disk 2 and the cooling disk 30 are preferably integrally connected to each other. This may take place for example by a bonding process. As an alternative to this, the cooling disk 30 may also be produced by a coating process, for example direct depositing of carbon (C) from the vapor phase (CVD) on the crystal disk 2. In principle, it is also possible to make the cooling disk 30, the crystal disk 2 and the supporting body 20 grow one on top of the other in a correspondingly controlled crystal growing process.

In the exemplary embodiment, the cooling disk 30 is optically transparent and preferably contains sapphire. The reflective layer 14 is disposed on the rear side that is facing away from the crystal disk 2, i.e. on the flat side of the cooling disk 30 that is facing the cooling fluid 10, and is protected from chemical and mechanical attacks of the cooling fluid 10 by a protective layer 16, for example of gold (Au) or of silicon dioxide ($SiO_2$), in particular of aluminum oxide ($Al_2O_3$). In this examplary embodiment, the cooling disk 30 is consequently disposed internally in the resonator. The thickness of the reflective layer 14 and of the protective layer 16 is shown in an exaggerated form in the FIG. 1 and in practice is only a few µm.

Also suitable as materials for the cooling disk 30 are diamond or undoped YAG, the former having a high thermal conductivity and the latter having the same coefficient of thermal expansion as the crystal disk 2 customarily contains Yb:YAG.

In principle, it is also possible to dispose the reflective layer 14 that is located between the crystal disk 2 and the cooling element between the cooling disk 30 and the crystal disk 2. In this case, a separate protective layer 16 is no longer necessary.

In addition, in particular in the case of an integral connection of the crystal disk 2 to the cooling disk 30 and to the supporting body 20, the mechanical load-bearing capacity of the crystal disk 2 is increased, since the microcracks produced by the polishing of its flat sides are closed and their growth when mechanical stresses are exerted is correspondingly prevented.

Since the cooling disk 30 is likewise very thin and also has good thermal conduction, efficient cooling by the cooling fluid is also ensured.

Illustrated in the exemplary embodiment that is represented is an axial pumping configuration, in which a pumping light P is coupled into the laser element 1 on the surface 28 of the supporting body 20 that is facing away from the crystal disk 2. Also possible in principle is a radial pumping configuration, in which the pumping light P is coupled laterally into the crystal disk 2. In this case, windows or apertures must be provided in the wall 3 of the cooling chamber 4, in order to permit direct coupling in of the pumping light P on the narrow side of the crystal disk 2.

Figure 2:
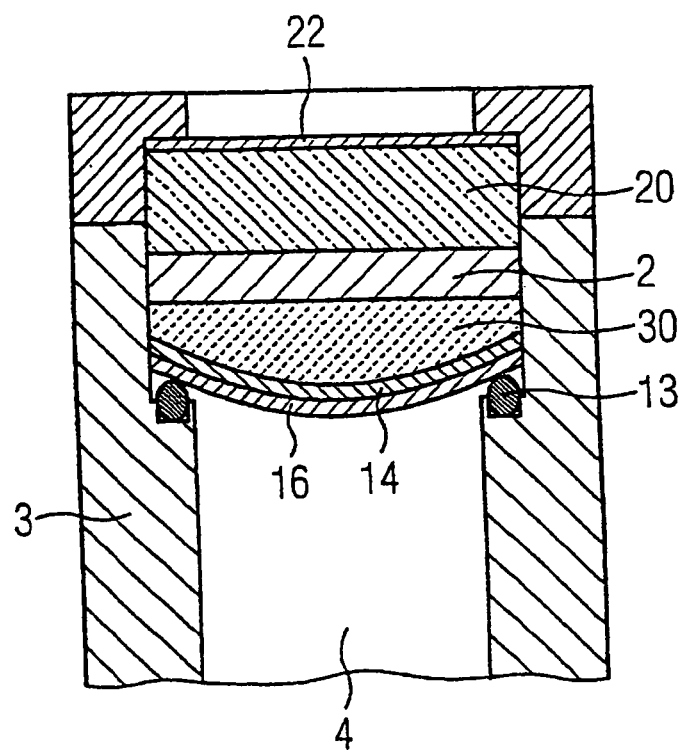
FIGS. 2 and 3 are longitudinal sectional views showing alternative configurations of the laser beam source according to the invention.

In the exemplary embodiment according to FIG. 2, the flat side of the cooling disk 30 that is facing the cooling element is convexly curved (outwardly curved), so that the reflective layer 14 disposed on the flat side forms a concave reflective surface for the laser light impinging on it. In FIG. 2, the curvature of the flat side of the cooling disk 30 that is facing the cooling element (in the example the wall 3 and the cooling chamber 4) is likewise shown in an exaggerated form. In practice, the change in the thickness of the cooling disk 30 from the edge to the center is only a few μm, so that, given corresponding dimensioning of the O-ring 13, a peripheral planar shoulder, as illustrated in FIG. 1 in the case of the supporting body 20, is not necessary.

In principle, it is also possible to provide both the flat side of the supporting body 20 that is facing away from the crystal disk 2 and the flat side of the cooling disk 30 that is facing away from the supporting body 20 with a concave curvature.

Figure 3:
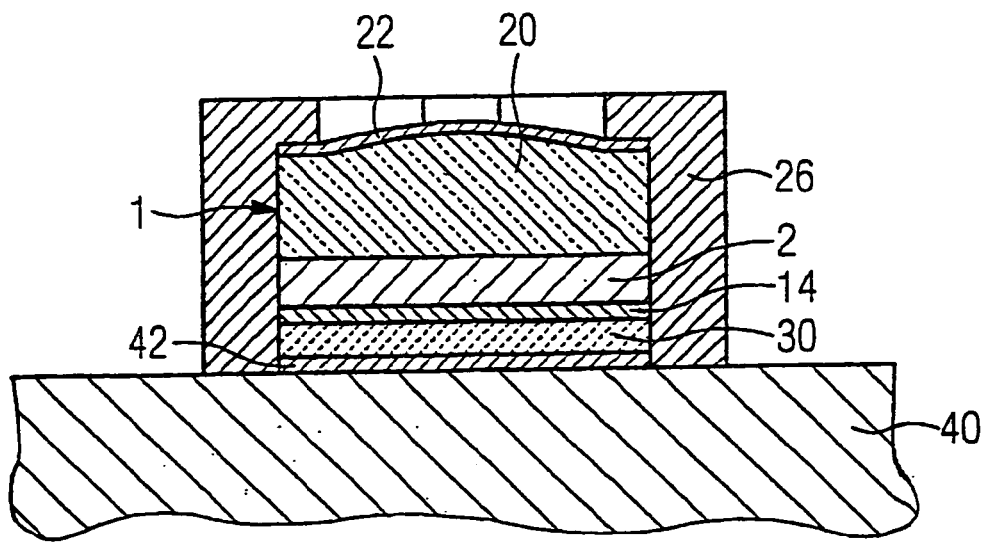

According to FIG. 3, the laser element 1 is fixed with the clamping ring 26 on a solid metallic body 40, which serves as a cooling element. This preferably contains copper (Cu) and is likewise flowed through by a cooling fluid. The crystal disk 2 is firmly braced with the heat sink 40 by the clamping ring 26 via the supporting body 20. Disposed between the crystal disk 2 and the heat sink 40 is the cooling disk 30, which rests on the heat sink 40 by use of a ductile intermediate layer 42, preferably of indium (In). The intermediate layer 42 permits good surface pressure and good thermal contact. As an alternative to this, the cooling disk 30 may also be soldered directly to the heat sink 40. In principle, a Peltier element is also suitable as the heat sink 40.

I claim:

1. A laser beam source comprising:
   a cooling element; and
   a laser element containing:
      a thin crystal disk functioning as a laser-active medium, said thin crystal disk having a first flat side being at least in indirect thermal contact with said cooling element and a second flat side;
      a cooling disk disposed between said cooling element and said thin crystal disk;
      an optically transparent supporting body disposed on said second flat side of said thin crystal disk, said second flat side facing away from said cooling element; and
      a clamping device resting on a free surface of said supporting body facing away from said crystal disk and disposed to firmly press said laser element against said cooling element.

2. The laser beam source according to claim 1, wherein said cooling disk is integrally connected at least indirectly to said thin crystal disk.

3. The laser beam source according to claim 2, wherein said cooling disk is bonded at least indirectly to said thin crystal disk.

4. The laser beam source according to claim 2, wherein said cooling disk contains sapphire.

5. The laser beam source according to claim 1, wherein said cooling disk is optically transparent.

6. The laser beam source according to claim 1, wherein:
   said laser element has a reflective surface disposed between said thin crystal disk and said cooling element; and
   said supporting body, said crystal disk and said cooling disk define an optical element, said optical element formed between a surface of said supporting body that is facing away from said thin crystal disk and said reflective surface, said optical element functioning as a curved resonator mirror.

7. The laser beam source according to claim 6, wherein said reflective surface is a reflective layer, supported on said first flat side of said thin crystal disk that is facing said cooling element.

8. The laser beam source according to claim 6, wherein said reflective surface is disposed on a surface of said cooling disk that is facing away from said thin crystal disk 9. The laser beam source according to claim 8, wherein said surface of said cooling disk that is facing away from said thin crystal disk is convexly curved.

10. The laser beam source according to claim 1, wherein said optically transparent supporting body is a saturable absorber.

11. The laser beam source according to claim 1, wherein said optically transparent supporting body contains a frequency multiplier crystal.

12. The laser beam source according to claim 1, wherein said optically transparent supporting body is bonded onto said thin crystal disk.

13. The laser beam source according to claim 1, wherein said cooling element is a metallic heat sink, which is axially braced with said optically transparent supporting body.

14. The laser beam source according to claim 13, wherein said laser element has an intermediate layer disposed on said metallic heat sink.

15. The laser beam source according to claim 1, wherein said cooling element has a cooling chamber formed therein for receiving a cooling fluid, said laser element forming a wall element of said cooling chamber.

16. The laser beam source according to claim 15, wherein said laser element has a protective layer with a surface facing said cooling chamber.

17. The laser beam source according to claim 16, wherein said protective layer contains aluminum oxide.

18. The laser beam source according to claim 1, wherein said thin crystal disk is axially pumped.

* * * * *